(12) United States Patent
Kim et al.

(10) Patent No.: US 7,395,076 B2
(45) Date of Patent: Jul. 1, 2008

(54) PAGING APPARATUS AND METHOD FOR MBMS SERVICE IN A MOBILE COMMUNICATION SYSTEM

(75) Inventors: Soeng-Hun Kim, Suwon-shi (KR); Kook-Heui Lee, Yongin-shi (KR); Sung-Ho Choi, Songnam-shi (KR); Ju-Ho Lee, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 720 days.

(21) Appl. No.: 10/465,321

(22) Filed: Jun. 18, 2003

(65) Prior Publication Data

US 2004/0029596 A1 Feb. 12, 2004

(30) Foreign Application Priority Data

Jun. 20, 2002 (KR) ........................ 10-2002-0034704

(51) Int. Cl.
H04Q 7/20 (2006.01)
(52) U.S. Cl. ..................... 455/458; 455/414.1
(58) Field of Classification Search ................. 455/450, 455/560, 414.1, 415, 503
See application file for complete search history.

(56) References Cited

U.S. PATENT DOCUMENTS

| | | | |
|---|---|---|---|
| 6,157,815 A | 12/2000 | Collins et al. | |
| 6,393,295 B1 | 5/2002 | Butler et al. | |
| 6,745,056 B2 * | 6/2004 | Wang et al. | 455/574 |
| 6,832,094 B2 * | 12/2004 | Butler et al. | 455/458 |
| 7,076,248 B2 * | 7/2006 | Amirijoo et al. | 455/432.1 |
| 7,177,658 B2 * | 2/2007 | Willenegger et al. | 455/522 |
| 2003/0134653 A1 * | 7/2003 | Sarkkinen et al. | 455/517 |
| 2003/0157949 A1 * | 8/2003 | Sarkkinen et al. | 455/503 |
| 2003/0174645 A1 * | 9/2003 | Paratainen et al. | 370/229 |

(Continued)

FOREIGN PATENT DOCUMENTS

EP 1 0 67 814 1/2001

(Continued)

OTHER PUBLICATIONS

European Search Report dated Oct. 21, 2003 issued in a counterpart application, namely, Appln. No. 03013855.6.

(Continued)

*Primary Examiner*—Creighton Smith
(74) *Attorney, Agent, or Firm*—The Farrell Law Firm, PC (57) ABSTRACT

A method for paging user equipments (UEs) receiving a second service in a mobile communication system providing a first service and the second service. A serving General Packet Radio Service (GPRS) support node (SGSN), determines an identifier indicating the second service and a coefficient related to paging occasions for transmitting a paging instance indicating presence/absence of paging information related to the second service in response to a request for the second service from UEs, and transmits the determined identifier and coefficient to a radio network controller (RNC). The RNC transmits the identifier and the coefficient to the UEs, determines the paging occasions and transmission times of the paging instance in each of the paging occasions by using the identifier and the coefficient, and transmits the paging instances over a first channel at the transmission times of the paging instances for each of the paging occasions so that the UEs recognize presence/absence of the paging information.

20 Claims, 6 Drawing Sheets

U.S. PATENT DOCUMENTS

2003/0223394 A1* 12/2003 Parantainen et al. ........ 370/336
2003/0232594 A1* 12/2003 Shaheen .................... 455/3.06
2006/0189272 A1*  8/2006 Willenegger et al. ....... 455/3.01

FOREIGN PATENT DOCUMENTS

| JP | 11-225375 | 8/1999 |
| JP | 2002-051006 | 2/2002 |
| WO | WO 96/10895 | 4/1996 |

OTHER PUBLICATIONS

"3rd Generation Project; Technical Specification Group Services and System Aspects; Multimedia Broadcast/Multicast Service; Architecture and Functional Description (Release 5) (3GPP TR 23.846 0.3.0)", Apr. 2, 2002, pp. 1-22.

* cited by examiner

PAGING APPARATUS AND METHOD FOR MBMS SERVICE IN A MOBILE COMMUNICATION SYSTEM

PRIORITY

This application claims priority under 35 U.S.C. § 119 to an application entitled "Paging Apparatus and Method for MBMS Service in a Mobile Communication System" filed in the Korean Intellectual Property Office on Jun. 20, 2002 and assigned Serial No. 2002-34704, the contents of which are incorporated herein by reference.

BACKGROUND OF THE INVENTION

1. Field of the Invention

The present invention relates generally to a mobile communication system, and in particular, to a paging apparatus and method for a multimedia broadcast/multicast service (MBMS) service.

2. Description of the Related Art

These days, due to the development of the communication industry, a service provided by a code division multiple access (CDMA) mobile communication system is developing into multicasting multimedia communication for transmitting not only voice service data but also high-capacity data such as packet data and circuit data. In order to support the multicasting multimedia communication, a broadcast/multicast service is required in which one data source provides a service to a plurality of user equipments (UE). The broadcast/multicast service can be divided into a cell broadcast service (CBS), which is a message-based service, and a multimedia broadcast/multicast service (MBMS) supporting multimedia data, such as real-time image and voice, still image, and text.

Network architecture for providing an MBMS service in a mobile communication system will now be described with reference to FIG. 1.

Figure 1:
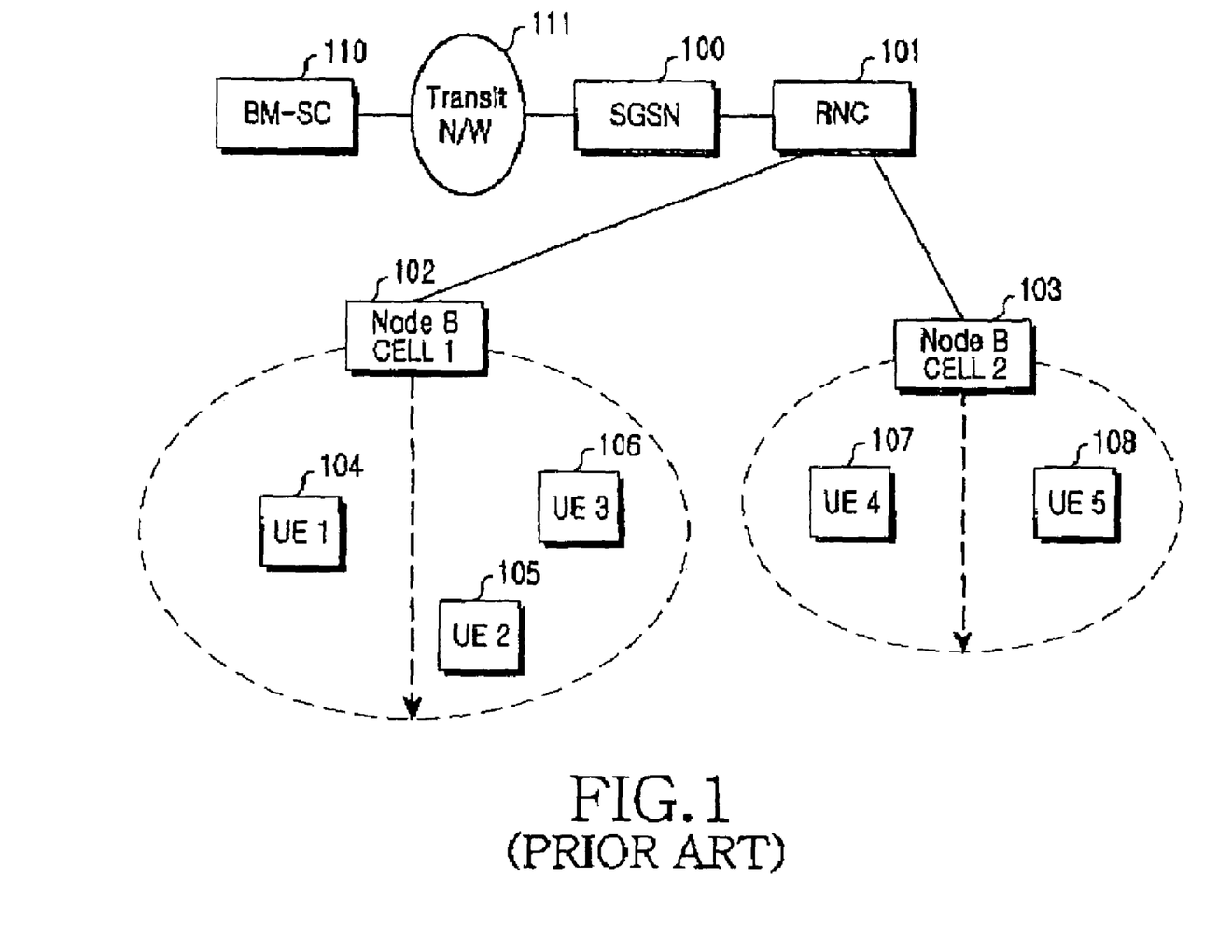
FIG. 1 schematically illustrates network architecture for providing an MBMS service in a mobile communication system.

FIG. 1 schematically illustrates network architecture for providing an MBMS service in a mobile communication system. Referring to FIG. 1, a multicast/broadcast service center (BM-SC) 110 is a source that provides an MBMS service stream, and the BM-SC 110 delivers an MBMS service stream to a transit network (NW) 111 after scheduling. The transit network 111 is a network existing between the BM-SC 110 and a serving General Packet Radio Service (GPRS) support node (SGSN) 100, and delivers the MBMS service stream provided from the BM-SC 110 to the SGSN 100. It is assumed herein that the SGSN 100 can be comprised of a gateway GPRS support node (GGSN) and an external network, and there exist a plurality of UEs desiring to receive the MBMS service at a certain time, i.e., UE1 104, UE2 105 and UE3 106 belonging to a Node B Cell 1 102 and UE4 107 and UE5 108 belonging to a Node B Cell 2 103. The SGSN 100, receiving the MBMS service stream from the transit network 111, performs MBMS service-related control on subscribers (or UEs) desiring to receive an MBMS service. For example, the MBMS service-related control includes management of MBMS service accounting-related data for each subscriber and selective transmission of MBMS service data to a particular radio network controller (RNC) 101. In addition, the SGSN 100 forms and manages an SGSN service context for an MBMS service X, and delivers a stream for the MBMS service to the RNC 101. The RNC 101 controls a plurality of Node Bs, and transmits MBMS service data to a Node B where there exists a UE requesting the MBMS service among Node Bs managed the RNC 101 itself. In addition, the RNC 101 controls a radio channel established to provide the MBMS service, and forms and manages an RNC service context for the MBMS service X by using the MBMS service stream provided from the SGSN 100. As illustrated in FIG. 1, only one radio channel is formed between one Node B, e.g., the Node B Cell 1 102, and the UEs 104, 105 and 106 belonging to the Node B Cell 1 102. Furthermore, a home location register (HLR), though not illustrated in FIG. 1, is connected to the SGSN 100 and performs subscriber authentication for the MBMS service.

In addition, as mentioned above, the RNC 101 and the SGSN 100 manage service-related information according to MBMS services, and the service-related information managed according to MBMS services is defined herein as "MBMS service context." For example, information stored in the MBMS service context includes a list of UEs desiring to receive an MBMS service, i.e., UE identifiers (IDs) of UEs desiring to receive the MBMS service, a service area where the UEs are located, and a quality of service (QoS) needed to provide the MBMS service.

A procedure for providing an MBMS service will now be described herein below.

In order to provide the MBMS service, fundamental information on the MBMS service must first be transmitted to the UEs, and if the UEs receiving the fundamental information on the MBMS service desire to receive the MBMS service, then a list of the UEs requesting the MBMS service must be transmitted to a network. Upon receiving the list of the UEs desiring to receive the MBMS service, the network must page the UEs and set up a radio bearer for providing the MBMS service. After setting up a radio bearer between the network and the UEs, the network provides the MBMS service over the set radio bearer. Meanwhile, if the MBMS service is ended, the fact must be notified to all UEs. Then, all the UEs receiving the MBMS service must release all resources assigned for the MBMS service, for normal MBMS service.

However, in an existing communication system providing an MBMS service, there has been provided no detailed plan for the above-stated procedure for providing the MBMS service, especially a procedure for paging a UE. Accordingly, there is a demand for a method of paging a plurality of UEs receiving the MBMS service.

SUMMARY OF THE INVENTION

It is, therefore, an object of the present invention to provide a paging apparatus and method for an MBMS service in a mobile communication system.

It is another object of the present invention to provide a paging apparatus and method for an MBMS service for minimizing power consumption of a UE in a mobile communication system.

To achieve the above and other objects, the invention provides an apparatus for paging user equipments (UEs) providing a second service different from a first service in a mobile communication system providing the first service. The apparatus comprises a controller for calculating paging occasions for receiving a first channel signal and reception times of paging instances in each of the paging occasions by using parameters related to transmission of the first channel signal including the paging instances indicating presence/absence of paining information related to the second service, and receiving the paging instances at the reception times of the paging instances for each of the paging occasions; and a receiver for receiving the paging instances at the reception times of the paging instances for each of the paging occasions under the control of the controller, and receiving the paging information by receiving a second channel after a lapse of a preset time, if the received paging instances indicate presence of the paging information.

Further, the invention provides a method for paging user equipments (UEs) providing a second service different from a first service in a mobile communication system providing the first service. The method comprises the steps of: determining, by a serving General Packet Radio Service (GPRS) support node (SGSN), an identifier indicating the second service and a coefficient related to paging occasions for transmitting a paging instance indicating presence/absence of paging information related to the second service in response to a request for the second service from UEs, and transmitting the determined identifier and coefficient to a radio network controller (RNC); and transmitting, by the RNC, the identifier and the coefficient to the UEs, determining the paging occasions and transmission times of the paging instance in each of the paging occasions by using the identifier and the coefficient, and transmitting the paging instances over a first channel at the transmission times of the paging instances for each of the paging occasions so that the UEs recognize presence/absence of the paging information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
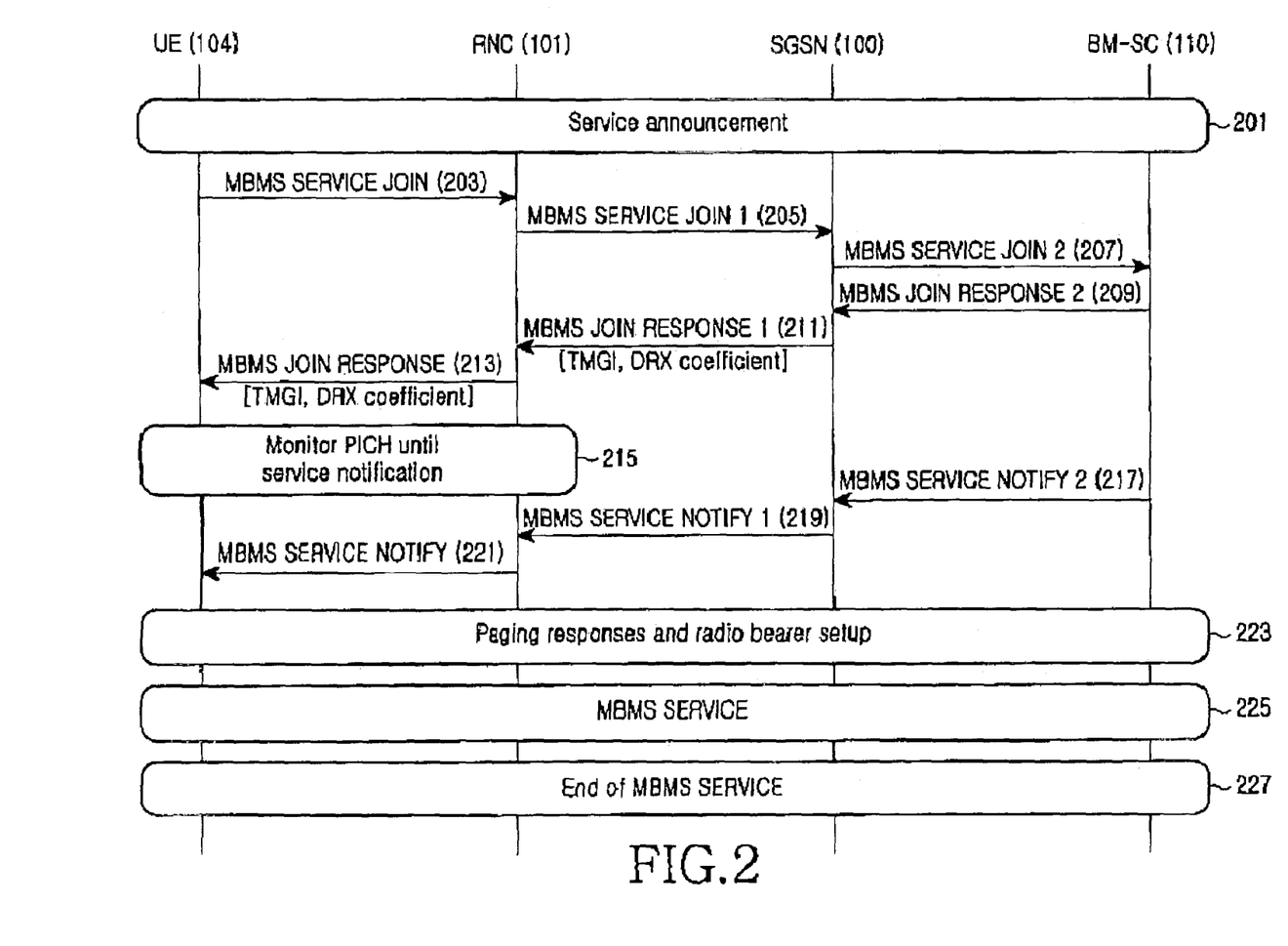
FIG. 2 is a signal flow diagram illustrating a procedure for starting an MBMS service in a mobile communication system according to a first embodiment of the present invention.

FIG. 2 is a signal flow diagram illustrating a procedure for starting an MBMS service in a mobile communication system according to a first embodiment of the present invention. It will be assumed herein that a mobile communication system providing the Multimedia Broadcast/Multicast Service (MBMS) service has the same structure as that of the mobile communication system described in conjunction with FIG. 1.

Referring to FIG. 2, a multicast/broadcast service center (BM-SC) 110 transmits a Service Announcement message in order to provide fundamental information for currently available MBMS services, for example, menu information, to user equipments (UEs), or MBMS service subscribers (Step 201). The "menu information" means information on a start time and duration of a particular MBMS service. The BM-SC 110 can broadcast the menu information to predetermined service areas, i.e., broadcast the menu information through a broadcast service such as a cell broadcast service (CBS), or transmit the menu information only to the UEs requesting the MBMS service. Through the menu information, the BM-SC 110 informs UEs of an MBMS service identifier (ID) for identifying each MBMS service. For convenience, it will be assumed in FIG. 2 that the MBMS service subscriber is UE 104. Upon receiving the menu information, the UE 104 selects a desired particular MBMS service from the menu information, and transmits an MBMS Service Join message for the selected MBMS service to a radio network controller (RNC) 101 (Step 203). The MBMS Service Join message transmitted from the UE 104 to the RNC 101 includes an MBMS service ID indicating the selected MBMS service and a UE ID indicating the corresponding UE (MBMS SERVICE JOIN=[MBMS SERVICE ID, UE ID]).

Upon receiving the MBMS Service Join message from the UE 104, the RNC 101 stores a UE ID of the UE 104 requesting the MBMS service in an MBMS service context managed by the RNC 101, and then transmits an MBMS Service Join message to a serving General Packet Radio Service (GPRS) support node (SGSN) 100 (Step 205). The MBMS service context refers to a set of control information needed to provided a particular MBMS service, and information stored in the MBMS service context includes, for example, a list of UEs desiring to receive an MBMS service, i.e., UE IDs of UEs desiring to receive the MBMS service, a service area where the UEs are located, and a quality of service (QoS) required to provide the MBMS service. Meanwhile, the MBMS Service Join message transmitted from the RNC 101 to the SGSN 100 includes the MBMS service ID, the UE ID, and an RNC ID indicating a corresponding RNC, i.e., the RNC 101 (MBMS SERVICE JOIN 1=[MBMS SERVICE ID, UE ID, RNC ID]). Upon receiving the MBMS Service Join message from the RNC 101, the SGSN 100 stores the UE ID and the RNC ID in an MBMS service context managed by the SGSN 100 itself, and then transmits an MBMS Service Join message to the BM-SC 110 (Step 207). The MBMS Service Join message transmitted from the SGSN 100 to the BM-SC 110 includes the MBMS service ID and an SGSN ID indicating a corresponding SGNS, i.e., the SGSN 100 (MBMS SERVICE JOIN 2=[MBMS SERVICE ID, SGSN ID]).

Upon receiving the MBMS Service Join message from the SGSN 100, the BM-SC 110 stores an SGSN ID of the SGSN 100 in an MBMS service context managed by the BM-SC 110 itself. Thereafter, the BM-SC 110 transmits an MBMS Service Join Response message, a response message for the MBMS Service Join message, to the SGSN 100 (Step 209). Upon receiving the MBMS Service Join Response message from the BM-SC 110, the SGSN 100 assigns a temporary multicast group identity (TMGI) to an MBMS service designated by the MBMS Service Join Response message, and determines a discontinuous reception (DRX) coefficient. Thereafter, the SGSN 100 transmits the assigned TMGI and the determined DRX coefficient to the RNC 101 along with an MBMS Service Join Response message (MBMS JOIN RESPONSE 1=[MBMS SERVICE ID, TMGI, DRX coefficient]) (Step 211). The TMGI and the DRX coefficient will be described later.

Upon receiving the MBMS Service Join Response message from the SGSN 100, the RNC 101 transmits the MBMS service ID, TMGI and DRX coefficient to UEs requesting an MBMS service corresponding to an MBMS service ID included the received MBMS Service Join Response message, i.e., the UE 104, along with an MBMS Service Join Response message (MBMS JOIN RESPONSE=[MBMS SERVICE ID, TMGI, DRX coefficient]) (Step 213). In the state where both the RNC 101 and the UE 104 recognize the TMGI and the DRX coefficient, the UE 104 monitors a paging indicator channel (PICH) to determine whether an MBMS service requested by the UE 104 is paged (Step 215). Herein, the UE 104 monitors the PICH every set cycle DRX_CL calculated using the DRX coefficient. As a result of the PICH monitoring, if it is determined that a paging channel (PCH) must be received, the UE 104 receives PCH. Over the PCH is transmitted an MBMS Service Notify message, a paging message related to the MBMS service. The details related to the paging will be described later.

The TMGI and the DRX coefficient will now be described herein below.

First, the TMGI will be described. The TMGI is a temporary identity uniquely assigned to each MBMS service by a corresponding SGSN. The TMGI is assigned at a time when an MBMS service context for a particular MBMS service is initially generated, and deleted at a time when an MBMS service having the TMGI is ended. Even though there is no specific rule in assigning the TMGI, one SGSN must assign a unique TMGI to one MBMS service.

Second, the DRX coefficient will be described. The DRX coefficient is used to calculate a set cycle DRX_CL for the PICH monitoring. For example, the invention determines the DRX coefficient as one of the integers greater than or equal to 3 and less than 9 (3≦DRX_coefficient<9). The SGSN 100 determines the DRX coefficient so that a set cycle DRX CL appropriate for a system condition is set to a particular MBMS service. For example, the DRX coefficient can be determined according to the number of UEs in a cell. In this case, the DRX coefficient can be determined considering a radio environment. That is, the DRX coefficient can be determined according to a current channel condition. A value of the DRX_CL may be either equal to or different from the DRX coefficient. Of course, the DRX coefficient value or the DRX_CL value can be variably determined according to the system condition.

Meanwhile, the BM-SC 110 transmits an MBMS Service Notify message to the SGSN 100 to thereby notify that the MBMS service will be started soon (Step 217). The MBMS Service Notify message transmitted from the BM-SC 110 to the SGSN 100 includes a service ID of an MBMS service to be started soon (MBMS SERVICE NOTIFY 2=[MBMS SERVICE ID]). Upon receiving the MBMS Service Notify message from the BM-SC 110, the SGSN 100 transmits to the RNC 101 an MBMS Service Notify message indicating that the MBMS service will be started before long (Step 219). The MBMS Service Notify message transmitted from the SGSN 100 to the RNC 101 includes the assigned TMGI indicating the MBMS service (MBMS SERVICE NOTIFY 1=[TMGI]). Upon receiving the MBMS Service Notify message, the RNC 101 transmits an MBMS Service Notify message indicating that the requested MBMS service will be started shortly, to UEs requesting an MBMS service corresponding to the TMGI included in the received MBMS Service Notify message, i.e., the UE 104 (Step 221). The MBMS Service Notify message transmitted from the RNC 101 to the UE 104 also includes the TMGI (MBMS SERVICE NOTIFY=[TMGI]). In transmitting the MBMS Service Notify message, the RNC 101 notifies UEs that the MBMS Service Notify message will be transmitted over PCH, by using a paging instance of a paging occasion assigned to an MBMS service corresponding to the TMGI. The paging occasion may be transmitted along with a UE's DRX cycle proposed by the invention, or may be transmitted using a cycle of a general paging indicator channel.

The paging occasion represents an indicator indicating whether an MBMS Service Notify message, or a paging message, is transmitted, i.e., represents a period for which a paging instance is transmitted. A procedure for transmitting and receiving the MBMS Service Notify message will be described later.

Receiving the MBMS Service Notify message, that means the requested MBMS service will be started, the UE 104 transmits a Paging Response message, or a response message for the MBMS Service Notify message, and at the same time, sets up a radio bearer (Step 223). When the radio bearer is set up, the BMSC 110 transmits corresponding MBMS service data over the set radio bearer thereby providing the MBMS service (Step 225). In the meantime, if the MBMS service is ended, the UE 104 releases such resources as the set radio bearer (END OF MBMS SERVICE) (Step 227).

A paging procedure will now be described herein below. The paging procedure means an entire procedure in which a network pages a particular UE. When paging a UE, the network uses a DRX technique in order to minimize power consumption of the UE. In the DRX technique, the UE, together with the network, previously sets a time when the UE turns on a receiver to receive a paging message, and receives the paging message only at the set time. Since the UE uses the DRX technique, it turns on a receiver only at a time previously set together with the network, and turns off the receiver at the other times except the set time, thereby minimizing power consumption. More specifically, when PICH is received for a paging occasion and a corresponding paging instance of PICH is set to "1," the UE receives a paging message transmitted over PCH. In this case, a system frame number (SFN) corresponding to the paging occasion is calculated by $$SFN(PO) = TMGI\_K \bmod DRX\_CL + n*DRX\_CL \quad \text{Equation (1)}$$

where n=0, 1, 2, 3, . . . .

In Equation (1), SFN(PO) has a value less than 8191, TMGI_K=TMGI div K, DRX_CL=$2^{DRX\_coefficient}$, and PO represents the paging occasion. In addition, SFN is an integer that repeatedly increases between 0 and 8191, and one system frame has a period of 10 msec. Furthermore, K used in calculating TMGI_K indicates the number of secondary common control physical channels (S-CCPCH)/PCHs formed in a corresponding cell. The S-CCPCH/PCH means S-CCPCH used as PCH. As illustrated in Equation (1), the paging occasion becomes a set of SFNs repeated at periods of DRX_CL.

The paging occasion will now be described with reference to FIG. 3.

Figure 3:
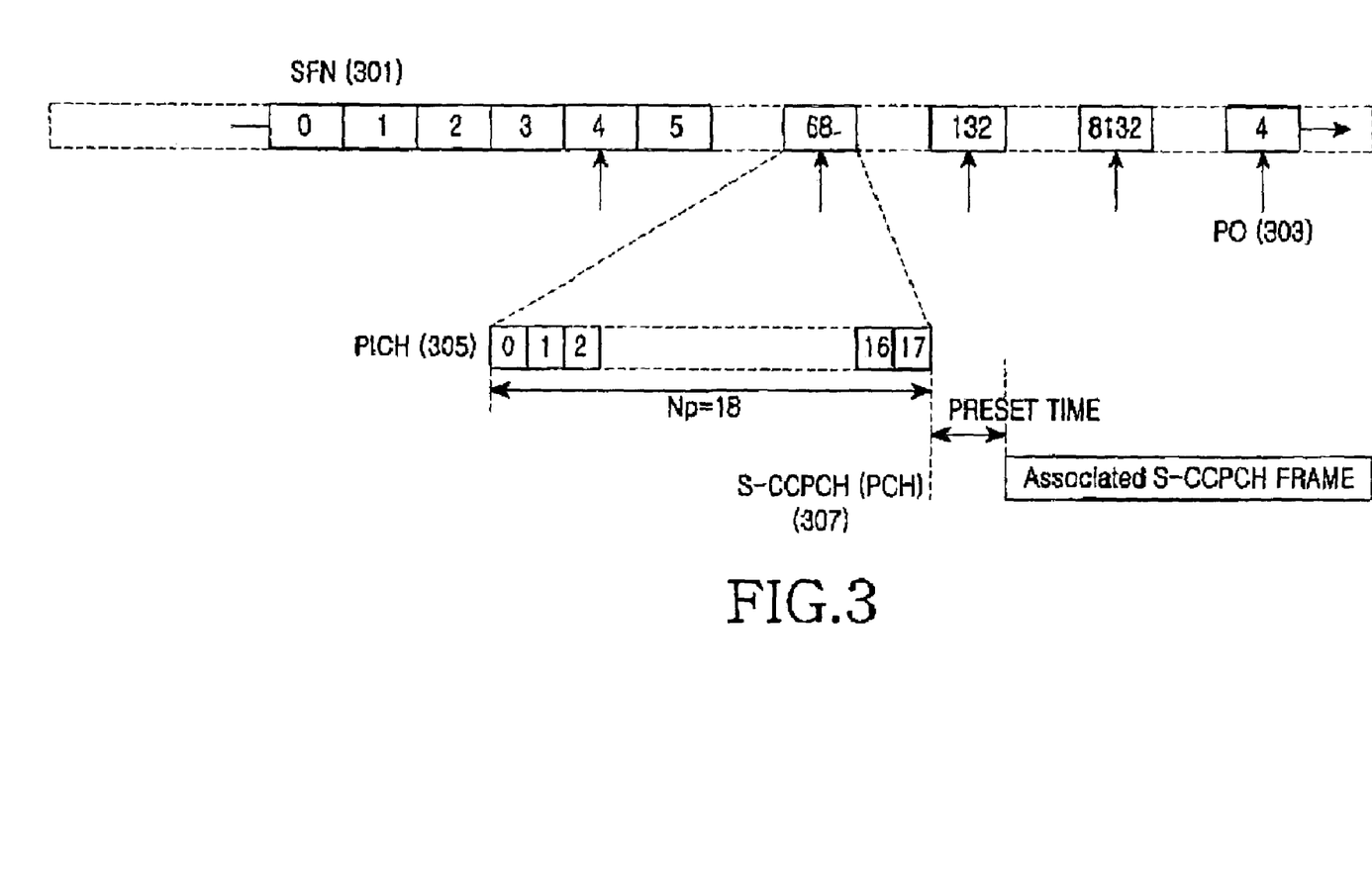
FIG. 3 schematically illustrates a paging occasion of a mobile communication system.

FIG. 3 schematically illustrates a paging occasion of a mobile communication system. Referring to FIG. 3, if a DRX coefficient assigned to a particular MBMS service is 6 (DRX coefficient=6), DRX_CL of the MBMS service becomes 64 as mentioned above (DRX_CL=64). In addition, if TMGI assigned to the MBMS service is 1000 (TMGI) and K=1, a paging occasion of the MBMS service is expressed by a set of SFNs, as follows.

$$SFN(PO) = [000 \bmod 6 = 4, 1000 \bmod 6 + 64 = 68, 1000 \bmod 6 + 64*2 = 132, \ldots, 1000 \bmod 6 + 64*127 = 8132]$$

The determined paging occasions are indicated by an arrow on an SFN axis 301 of FIG. 3. That is, points 303 with SFN=4, 68, 132, . . . , 8132 become the paging occasions. The paging occasion means SFN of PICH including a paging instance of a corresponding MBMS service. A paging instance within a particular paging occasion indicates whether UEs desiring to receive a corresponding MBMS service must receive a paging message transmitted over PCH, and a relationship between a particular MBMS service and a paging instance is given by $$PI = DRX\_Index \bmod Np, DRX\_Index = TMGI\_div\_8192 \quad \text{Equation (2)}$$

In Equation (2), PI represents a paging instance, and Np is one of intergers from the set of [18, 36, 72, 144] and defined as system information (SI). The Np indicates how many paging instances exist in one system frame. For example, in FIG. 3, Np=18 (see 305). For TMGI=1000, a DRX index of a corresponding MBMS service is 0, so a paging instance corresponding to the MBMS service is a $0^{th}$ paging instance.

Therefore, UEs desiring to receive the MBMS service analyze a $0^{th}$ paging instance of a system frame corresponding to a paging occasion of PICH, and if the $0^{th}$ paging instance is set to "1", the UEs receive paging messages of an associated S-CCPCH frame and determine whether there is any paging message for the UEs. If the $0^{th}$ paging instance is set to "0", a corresponding UE waits until the nexT_paging occasion and then performs a process of analyzing again the $0^{th}$ paging instance of the system frame. Here, the associated S-CCPCH means a physical channel to which PCH is mapped, and the associated S-CCPCH frame means S-CCPCH that continues for one system frame, starting after a time set before PICH. If a particular paging instance is set to "1", the UE must receive all associated S-CCPCH frames of the paging instance and determine whether there is any paging message corresponding to the UE itself. FIG. 3 shows an associated S-CCPCH frame 307 of PICH with SFN 68.

The first embodiment of the present invention will be summarized herein below. If a request for a particular MBMS service occurs, an SGSN 100 determines TMGI and DRX coefficient for the requested MBMS service and notifies the determined TMGI and DRX coefficient to an RNC and UEs scheduled to receive the MBMS service, i.e., an RNC 101 and a UE 104. Then, the RNC 101 and the UE 104 calculate a paging occasion and a paging instance by using the TMGI and the DRX coefficient notified by the SGSN 100. Before transmitting an MBMS Service Join message over PCH, the RNC 101 sets a paging instance of a paging occasion of PICH to "1" so that UEs desiring to receive the MBMS service can receive an MBMS Service Notify message transmitted over PCH. Thereafter, the RNC 101 transmits the MBMS Service Join message through an associated S-CCPCH frame of a paging occasion to which a paging instance set to "1" belongs. Therefore, the UE 104 analyzes a paging instance of PICH every paging occasion, and if it is determined that the paging instance is set to "1", the UE 104 receives an associated S-CCPCH frame of the paging occasion and determines whether there is any MBMS Service Notify message related to the MBMS service that the UE 104 itself desires to receive.

Next, a second embodiment of the present invention will be described. In the second embodiment, if a service start time for a particular MBMS service is previously notified, PICH is monitored at around the service start time thereby minimizing UE's power consumption caused by a paging procedure.

A paging procedure according to a second embodiment of the present invention will now be described with reference to FIG. 4.

Figure 4:
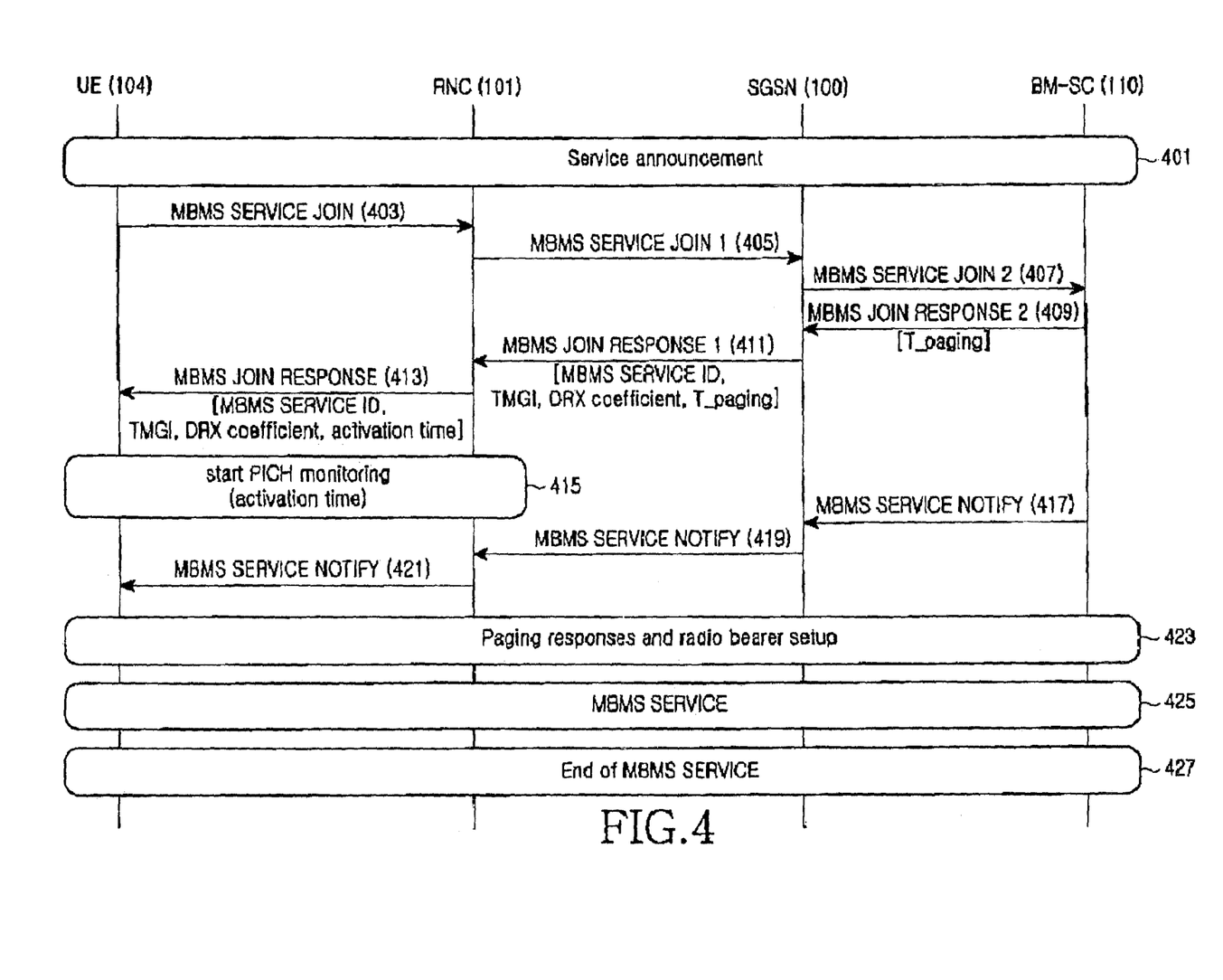
FIG. 4 is a signal flow diagram illustrating a procedure for starting an MBMS service in a mobile communication system according to a second embodiment of the present invention.

FIG. 4 is a signal flow diagram illustrating a procedure for starting an MBMS service in a mobile communication system according to a second embodiment of the present invention. Referring to FIG. 4, a process in steps 401 to 407 is identical to the process in steps 210 to 207 described in conjunction with FIG. 2, so a detailed description thereof will be omitted. Through the process in steps 401 to 407, a list of UEs desiring to receive a particular MBMS service, i.e., UEs that requested the MBMS service, for example, a UE 104, is stored in MBMS service contexts of an SGSN 100 and an RNC 101. Thereafter, a BM-SC 110 transmits an MBMS Service Join Response message, a response message for the MBMS Service Join message, to the SGSN 100 (Step 409). The MBMS Service Join Response message transmitted from the BM-SC 110 to the SGSN 100 includes an MBMS service ID and "T_paging" indicating a transmission time of an MBMS Service Notify message (MBMS JOIN RESPONSE 2=[MBMS SERVICE ID, T_paging]). The T_paging indicates an MBMS Service Notify message transmission time closely related to the MBMS service start time of the BM-SC 110, and can be expressed in various formats. For example, the T_paging can be expressed in the format of "hh:mm:ss", where hh represents hour, mm minute, and ss second. The MBMS Service Notify message transmission time is determined as a time going ahead of an actual MBMS service start time, and the BM-SC 110 can previously schedule the T_paging. In addition, when the BM-SC 110 cannot accurately determine the T_paging, the BM-SC 110 may select the most preceding scheduled time from available scheduled times, as the T_paging. For example, if an expected transmission time of the MBMS Service Notify message is 15:30:00~17:30:30, the BM-SC 110 selects the most preceding time 15:30:00 among the scheduled times as T_paging.

Upon receiving an MBMS Service Join Response message from the BMSC 110, the SGSN 100 determines TMGI and DRX coefficient for the MBMS service, and transmits to the RNC 101 an MBMS Join Response message along with the determined TMGI and DRX coefficient, including, the T_paging received from the BM-SC 110 and a corresponding MBMS service ID (MBMS JOIN RESPONSE 1=[MBMS SERVICE ID, TMGI, DRX coefficient, T_paging]) (Step 411). Upon receiving the MBMS Service Join Response message, the RNC 101 determines a paging occasion, a paging instance and an activation time, and then transmits an MBMS Service Join Response message to the UE 104 (Step 413). The MBMS Service Join Response message transmitted from the RNC 101 to the UE 104 includes the MBMS service ID, TMGI, DRX coefficient, and activation time (MBMS JOIN RESPONSE=[MBMS SERVICE ID, TMGI, DRX coefficient, Activation time]). The activation time is an integer determined by expressing a difference between a transmission time of the MBMS Service Join Response message and the T_paging by the 10 msec. For example, if the activation time is set to 50 (activation time=50), it means that an MBMS Service Notify message is transmitted 50*10 msec after the MBMS Service Join Response message is transmitted.

Upon receiving the MBMS Service Join Response message from the RNC 101, the UE 104 performs the following operation (Step 415).

(1) The UE 104 stores the activation time in a counter "T_MBMS_PAGING," and decreases the counter by 1 every 10 msec.

(2) The UE 104 calculates a paging occasion and a paging instance in the method described in conjunction with the first embodiment, by using TMGI and DRX coefficient.

(3) If a value of the counter T_MBMS_PAGING becomes 0, the UE 104 performs an operation of monitoring the calculated paging occasion and paging instance, i.e., performs the same operation as the MBMS paging procedure described in conjunction with the first embodiment.

(4) If a paging instance of a particular paging occasion is set to 1, the UE 104 receives its MBMS Service Notify message by receiving an associated SCCPCH frame of the paging occasion.

The second embodiment has been described on the assumption that the BM-SC 110 provides T_paging. Unlike this, when the BM-SC 110 does not provide the T_paging, the UE 104 may notify the RNC 101 of the service start time acquired in the process of transmitting a Service Announcement message so that the RNC 101 determines an activation time. That is, if the UE 104 informs the RNC 101 of the MBMS service start time "MBMS SERVICE START TIME" detected from the Service Announcement message, the RNC 101 can determine T_paging by using the MBMS service start time. The procedure for determining T_paging is represented by $$T\_paging = MBMS\ SERVICE\ START\ TIME - T\_NOTIFY$$

Here, T_NOTIFY is a time difference between the MBMS service start time and the MBMS Service Notify message transmission time, and can be previously given to the RNC 101. The RNC 101 calculates an activation time by using the calculated T_paging and informs the UE 104 of the activation time.

A process in steps 417 to 427 of FIG. 4 is identical to the process in steps 217 to 227 described in conjunction with FIG. 2, so a detailed description thereof will not be provided.

Next, a third embodiment of the present invention will be described with reference to FIG. 5. The third embodiment proposes a method for applying different DRX_CLs on the basis of T_paging. In the third embodiment, the reason for applying different DRX_CLs is as follows. That is, in the second embodiment, a UE is not required to turn on a receiver for the paging procedure until T_paging, contributing to a reduction in power consumption. However, the network cannot page the UE. That is, the third embodiment provides a method for setting relatively long DRX_CL until T_paging so that the UE receivers are turned on once every long cycle to perform a paging procedure, and after the T_paging, setting relatively short DRX_CL so that the UE receivers are turned on once every short cycle to perform the paging procedure.

Figure 5:
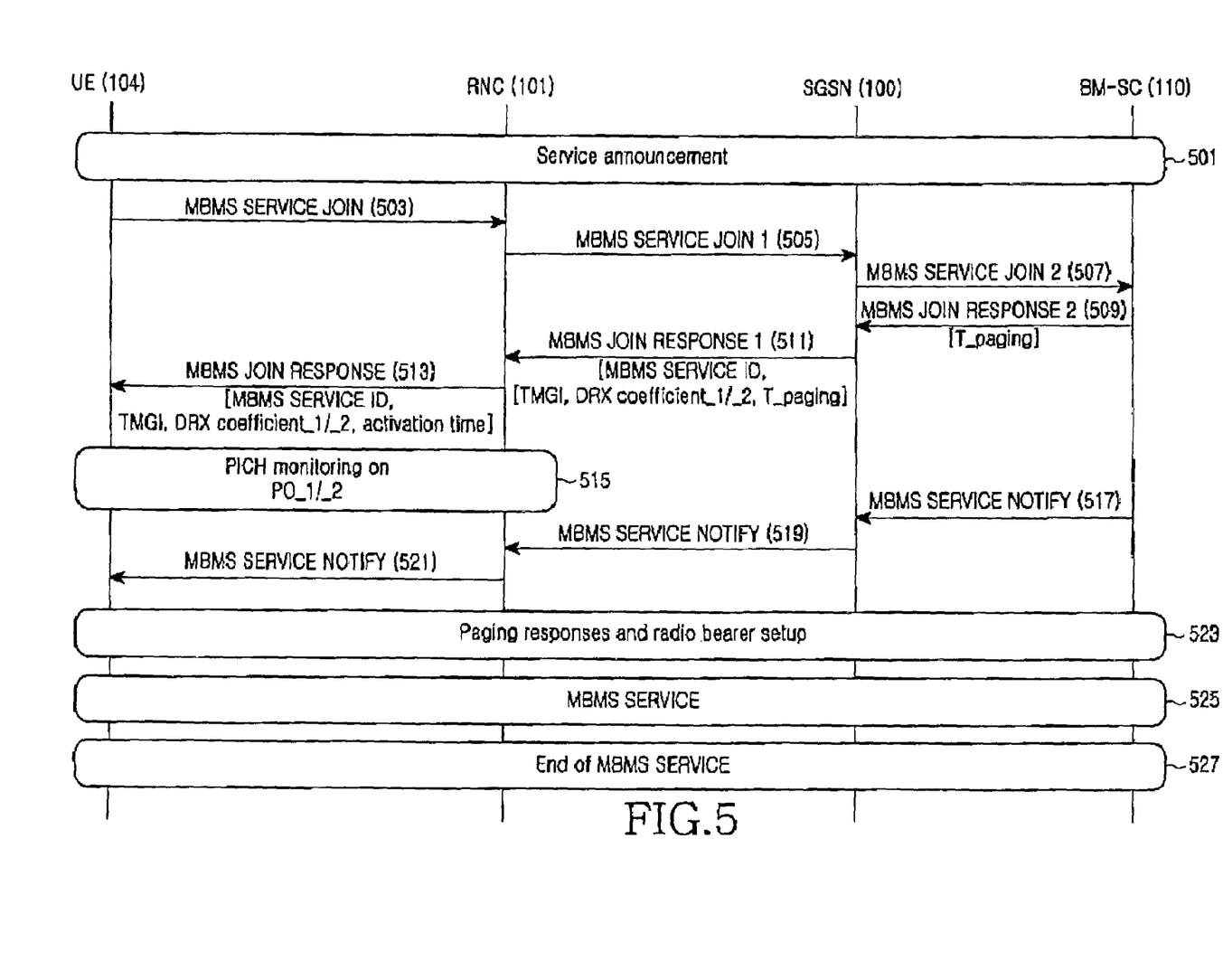
FIG. 5 is a signal flow diagram illustrating a procedure for starting an MBMS service in a mobile communication system according to a third embodiment of the present invention.

FIG. 5 is a signal flow diagram illustrating a procedure for starting an MBMS service in a mobile communication system according to a third embodiment of the present invention. In describing FIG. 5, a DRX coefficient to be applied until T_paging will be defined as a first DRX coefficient (or DRX coefficient_1), and a DRX coefficient to be applied after T_paging will be referred to as a second DRX coefficient (or DRX coefficient_2).

Referring to FIG. 5, a process in steps 501 to 507 is identical to the process in steps 201 to 207 described in conjunction with FIG. 2 and the process in steps 401 to 407 described in conjunction with FIG. 4, so a detailed description thereof will not be provided. Also, a process in step 509 of FIG. 5 is identical to the process in step 409 of FIG. 4, so a detailed description thereof will be omitted. After completing the process of up to step 509, an SGSN 100 determines TMGI for the MBMS service, a first DRX coefficient and a second DRX coefficient, and then transmits to an RNC 101 an MBMS Service Join Response message along with the determined TMGI, first DRX coefficient and second DRX coefficient, including T_paging received from the BM-SC 110 and an MBMS service ID indicting the MBMS service (MBMS JOIN RESPONSE 1=[MBMS SERVICE ID, TMGI, DRX coefficient_1/_2, T_paging]) (Step 511).

Upon receiving the MBMS Service Join Response message from the SGSN 100, the UE 104 determines an activation time, a paging occation_1, a paging occasion_2 and a paging instance, and then transmits an MBMS Service Join Response message to the UE 104 (Step 513). The MBMS Service Join Response message transmitted from RNC 101 to the UE 104 includes MBMS service ID, TMGI, DRX coefficient and activation time (MBMS JOIN RESPONSE= [MBMS SERVICE ID, TMGI, DRX coefficient_1/_2, activation time]). The paging occasion_1 is a paging occasion calculated using the first DRX coefficient, and the paging occasion_2 is a paging occasion calculated using the second DRX coefficient.

Upon receiving the MBMS Service Join Response message from the RNC 101, the UE 104 performs the following operation (Step 515).

(1) The UE 104 stores the activation time in a counter "T_MBMS_PAGING," and decreases the counter by 1 every 10 msec.

(2) The UE 104 calculates a paging occasion_1 and a paging instance in the method described in conjunction with the first embodiment, by using TMGI and a first DRX coefficient.

(3) Until the counter T_MBMS_PAGING becomes 0, the UE 104 monitors PICH in the method described in conjunction with the first embodiment, by using the paging occasion_1 and the paging instance.

(4) The UE 104 calculates a paging occasion_2 and a paging instance in the method described in conjunction with the first embodiment, by using TMGI and a second DRX coefficient.

(5) If the counter T_MBMS_PAGING becomes 0, the UE 104 monitors PICH in the method described in conjunction with the first embodiment, by using the paging occasion_2 and the paging instance.

(6) If the monitored paging instance of a particular paging occasion is set to "1", the UE 104 receives its MBMS Service Notify message by receiving an associated S-CCPCH frame of the paging occasion.

In addition, a process in steps 517 to 527 of FIG. 5 is identical to the process in steps 217 to 227 described in conjunction with FIG. 2 and the process in steps 417 to 427 described in conjunction with FIG. 4, so a detailed description thereof will be omitted.

A UE structure for performing functions in the embodiments of the present invention will now be described with reference to FIG. 6.

Figure 6:
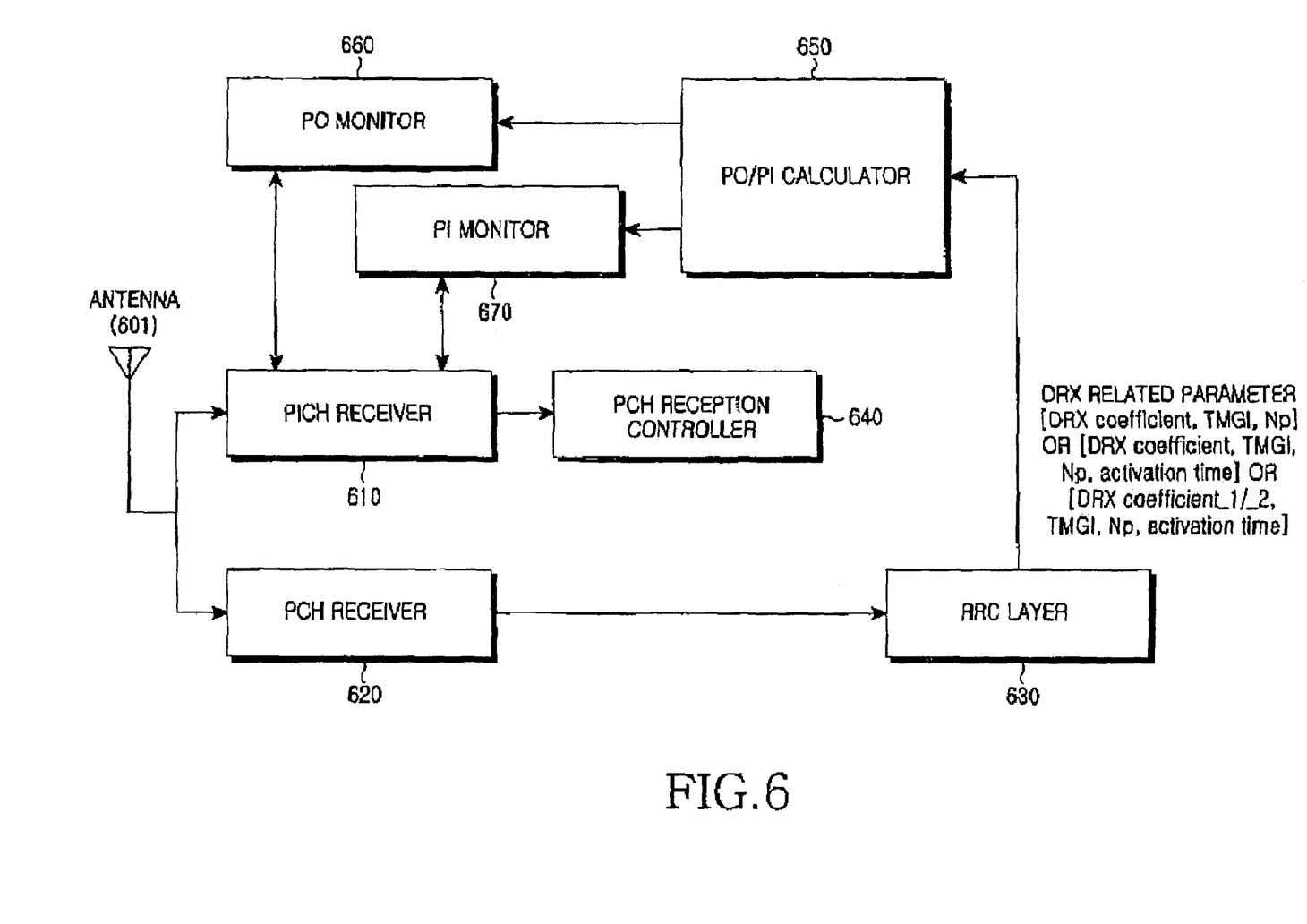
FIG. 6 is a block diagram illustrating a UE internal structure for performing functions in the embodiments of the present invention.

FIG. 6 is a block diagram illustrating a UE internal structure for performing functions in the embodiments of the present invention. Referring to FIG. 6, a radio resource control (RRC) layer 630 of the UE provides DRX-related parameters included in an MBMS Service Join Response message received from an RNC to a paging occasion/paging instance (PO/PI) calculator 650. The "DRX-related parameters" refer to DRX coefficient, TMGI and Np in the first embodiment, DRX coefficient, TMGI, Np and activation time in the second embodiment, and first DRX coefficient, second DRX coefficient, TMGI, Np and activation time in the third embodiment. The PO/PI calculator 650 receives the DRX-related parameters provided from the RRC layer 630, and calculates a paging instance and a paging occasion, i.e., an I(PI) value, an Np value and SFN(PO), by using the received DRX-related parameters. Thereafter, the PO/PI calculator 650 provides the calculated SFN(PO) to a paging occasion monitor (PO_TO_ MONITOR) 660, and provides the calculated I(PI) value and Np value to a paging instance monitor (PI_TO_MONITOR) 670. The PO/PI calculator 650, as mentioned above, differently calculates a paging occasion and a paging instance in the first embodiment, the second embodiment and the third embodiment. This is because the DRX-related parameters given in the first embodiment, the second embodiment and the third embodiment are different.

The paging instance monitor 670 stores an I(PI) value and an Np value provided from the PO/PI calculator 650, and provides the I(PI) value and the Np value to a PICH receiver 610. Each time the I(PI) value and the Np value are changed, the paging instance monitor 670 provides the changed I(PI) value and Np value to the PICH receiver 610 so that the PICH receiver 610 recognizes a change in the I(PI) value and the Np value on a real-time basis. The paging occasion monitor 660 stores an SFN(PO) value provided from the PO/PI calculator 650, and provides the SFN(PO) value to the PICH receiver 610. Each time the SFN(PO) value is changed, the paging occasion monitor 660 also provides the changed SFN(PO) value to the PICH receiver 610 so that the PICH receiver 610 recognizes a change in the SFN(PO) value on a real-time basis.

The PICH receiver 610 operates only for SFN corresponding to the SFN(PO) value output from the paging occasion monitor 660. The PICH receiver 610 handles PICH's PI corresponding to an I(PI) value output from the paging instance monitor 670 and provides the PI to a PCH reception controller 640. Here, the PICH receiver 610 equally divides a PICH radio frame by Np, using an I(PI) value and an Np value provided from the paging instance monitor 670, and then handles an (I(PI)+1)$^{th}$ PI. For example, in FIG. 3, if TMGI assigned to a particular MBMS service is 1000, an I(PI) value of the MBMS service becomes 0 by using Equation (2). As a result, the PICH receiver 610 handles a (0+1)$^{th}$ PI and provides the result to the PCH reception controller 640.

The PCH reception controller 640 analyzes PI provided from the PICH receiver 610. If the PI analysis result is "1", the PCH reception controller 640 controls a PCH receiver 620 to handle an associated S-CCPCH frame. In contrast, if the analysis result of PI provided from the PICH receiver 610 is "0", the PCH receiver 620 waits until the next PI is received. That is, as illustrated in FIG. 3, an associated S-CCPCH frame means S-CCPCH mapped to PCH that continues for one radio frame, starting after a time set before a particular PO. Therefore, an associated S-CCPCH frame becomes 38400-chip data transmitted over SCCPCH separated from a particular paging occasion by a predetermined time.

Meanwhile, the PCH receiver 620, under the control of the PCH reception controller 640, handles the associated S-CCPCH frame and provides the result to the RRC layer 630. The RRC layer 630 then determines whether the handled result output from the PCH receiver 620, or a corresponding message, is a message for the UE itself. If the corresponding message is a message for the UE itself, the RRC layer 630 performs a necessary operation according to information included in the message. For example, if a message provided from the PCH receiver 620 includes TMGI identical to TMGI of an MBMS service the UE desires to receive and the message is an MBMS Service Notify message, the RRC layer 630 forms a Paging Response message and transmits the Paging Response message to the RNC.

A description will now be made of a difference between the first embodiment, the second embodiment and the third embodiment in an operation of the UE described in conjunction with FIG. 6.

First, DRX-related parameters delivered from the RRC layer 630 to the PO/PI calculator 650 are different, and this will be described below.

(1) First Embodiment

The RRC layer 630 provides TMGI, DRX coefficient and Np to the PO/PI calculator 650. The PO/PI calculator 650 then calculates SFN(PO) and I(PI) according to Equation (1) and Equation (2), and provides the calculated I(PI) and the Np to the paging instance monitor 670 and the calculated SFN(PO) to the paging occasion monitor 660.

(2) Second Embodiment

The RRC layer 630 provides TMGI, DRX coefficient, activation time and Np to the PO/PI calculator 650. The PO/PI calculator 650 applies the activation time to a timer T_MBMS_PAGING, and then decreases the counter by 1 every radio frame, i.e., every 10 msec. In addition, the PO/PI calculator 650 calculates SFN(PO) and I(PI) by using Equation (1) and Equation (2). If a count value of the counter T_MBMS_PAGING becomes 0, the PO/PI calculator 650 provides the I(PI) and the Np to the paging instance monitor 670 and the SFN (PO) to the paging occasion monitor 660.

(3) Third Embodiment

The RRC layer 630 provides TMGI, first DRX coefficient, second DRX coefficient, activation time and Np to the PO/PI calculator 650. The PO/PI calculator 650 then calculates SFN (PO)_1 and I(PI) by applying the first DRX coefficient and the second DRX coefficient to Equation (1) and Equation (2). The PO/PI calculator 650 provides the calculated I(PI) and the Np to the paging instance monitor 670 and the calculated SFN(PO)_1 to the paging occasion monitor 660. Furthermore, the PO/PI calculator 650 applies the activation time to a counter T_MBMS_PAGING, and then decreases the counter by 1 every radio frame, i.e., every 10 msec. In addition, the PO/PI calculator 650 calculates SFN(PO)_2 by applying the second DRX coefficient and TMGI to Equation (1). Thereafter, if a count value of the counter T_MBMS_PAGING arrives at 0, the PO/PI calculator 650 provides the SFN(PO)_2 to the paging occasion monitor 660.

As described above, the present invention provides a paging method for an MBMS service in a mobile communication system providing an MBMS service. In addition, the invention allows a UE to perform a paging procedure considering various parameters such as TMGI, DRX coefficient and T_paging in a paging procedure for the MBMS service, thereby minimizing power consumption of the UE.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for paging user equipments (UEs) providing a second service different from a first service in a mobile communication system providing the first service and the second service, comprising the steps of:

determining, by a serving General Packet Radio Service (GPRS) support node(SGSN), an identifier indicating the second service and a coefficient related to paging occasions for transmitting a paging instance indicating presence/absence of paging information related to the second service in response to a request for the second service from the UEs, and transmitting the determined identifier and coefficient to a radio network controller (RNC); and transmitting, by the RNC, the identifier and the coefficient to the UEs, determining the paging occasions and transmission times of the paging instance in each of the paging occasions by using the identifier and the coefficient, and transmitting the paging instances over a first channel at the transmission times of the paging instances for each of the paging occasions so that the UEs recognize presence/absence of the paging information.

2. The method of claim 1, wherein the UEs determine the paging occasions and reception times of the paging instances in each of the paging occasions by using the identifier and the coefficient, monitor the first channel in each paging occasion, and receive, if the paging instances indicate presence of the paging information, the paging information by receiving a second channel after a lapse of a preset time.

3. The method of claim 2, wherein the first channel is a paging indicator channel (PICH) and the second channel is a paging channel (PCH).

4. A method for paging user equipments (UEs) providing a second service different from a first service in a mobile communication system providing the first service and the second service, comprising the steps of:

receiving, by a serving General Packet Radio Service(GPRS) support node (SGSN), a paging information transmission time when paging information related to the second service is to be transmitted, determining an identifier indicating the second service and a coefficient related to paging occasions for transmitting a paging instance indicating presence/absence of paging information related to the second service, and transmitting the determined identifier and coefficient to a radio network controller (RNC) along with the paging information transmission time; and determining, by the RNC, an activation time indicating a transmission start time of the paging occasions by using the paging information transmission time, transmitting the identifier, the coefficient and the activation time to the UEs, determining the paging occasions and transmission times of the paging instance in each of the paging occasions by using the identifier and the coefficient, and transmitting the paging instances over a first channel at the transmission times of the paging instances for each of the paging occasions beginning at the activation time so that the UEs recognize presence/absence of the paging information.

5. The method of claim 4, wherein the UEs determine the paging occasions and reception times of the paging instances in each of the paging occasions by using the identifier and the coefficient, monitor the first channel in each paging occasion beginning at the activation time, and receive, if the paging instances indicate presence of the paging information, the paging information by receiving a second channel after a lapse of a preset time.

6. The method of claim 5, wherein the first channel is a paging indicator channel (PICH) and the second channel is a paging channel (PCH).

7. A method for paging user equipments providing a Multicast/Broadcast Multimedia Service in a mobile communication system, comprising the steps of:

receiving, by a serving General Packet Radio Service support node a paging information transmission time when paging information related to the Multicast/Broadcast Multimedia Service is to be transmitted, determining an identifier indicating the Multicast/Broadcast Multimedia Service and normal paging coefficient and Multicast/Broadcast Multimedia Service coefficients related to paging occasions for transmitting a paging instance indicating presence/absence of paging information related to the Multicast/Broadcast Multimedia Service and transmitting the determined identifier and the normal paging coefficient and the Multicast/Broadcast Multimedia Service paging coefficient to a radio network controller along with the paging information transmission time; and determining, by the radio network controller an activation time indicating a transmission start time of the paging occasions by using the paging information transmission time, transmitting the identifier, the normal paging coefficient the Multicast/Broadcast Multimedia Service and the activation time to the user equipment, determining the paging occasions and transmission times of the paging instance in each of the paging occasions by using the identifier and the normal paging coefficient, determining the paging occasions and transmission times of the paging instance in each of the paging occasions by using the identifier and the Multicast/Broadcast Multimedia Service paging coefficient, transmitting the paging instances over a first channel at the transmission times of the paging instances for each of the paging occasions determined by using the coefficient from the present until the activation time, transmitting the paging instances over the first channel at the transmission times of the paging instances for each of the paging occasions determined by using the Multicast/Broadcast Multimedia Service paging coefficient from the activation time so that the user equipment recognize presence/absence of the paging information.

8. The method of claim 7, wherein the user equipment determine the paging occasions and reception times of the paging instances in each of the paging occasions by using the identifier and the normal paging coefficient, determine the paging occasions and reception times of the paging instances in each of the paging occasions by using the identifier and the Multicast/Broadcast Multimedia Service paging coefficient, monitor the first channel at the reception times of the paging instance for each of the paging occasions determined by using the normal paging coefficient from the present until the activation time, monitor the first channel at the reception times of the paging instance for each of the paging occasions determined by using the Multicast/Broadcast Multimedia Service paging coefficient from the activation time, and receives, if the paging instances indicate presence of the paging information, the paging information by receiving a second channel after a lapse of a preset time.

9. An apparatus for paging a user equipment providing a Multicast/Broadcast Multimedia Service in a mobile communication, the apparatus comprising:

a controller disposed in the user equipment, the controller for calculating paging occasions for receiving a signal from a first channel and reception times of paging instances in each of the paging occasions by using parameters and for controlling receipt of the paging instances at the reception times for each of the paging occasions, the parameters including an identifier indicating the Multicast/Broadcast Multimedia Service, normal paging coefficient, and Multicast/Broadcast Multimedia Service coefficients related to the paging occasions; and a receiver disposed in the user equipment, the receiver for receiving the paging instances.

10. The apparatus of claim 9, wherein the parameters are transmitted over the first channel.

11. The apparatus of claim 9, wherein the parameters include an activation time indicating a transmission start time of the paging occasions, all of which are transmitted over the first channel.

12. The apparatus of claim 11, wherein the receiver receives the paging information by receiving a second channel after a lapse of a preset time beginning at the activation time when the paging instances indicate presence of the paging information at the reception times of the paging instances for each of the paging occasions.

13. The apparatus of claim 11, wherein the controller calculates the paging occasions and reception times of the paging instance in each of the paging occasions by using the identifier and the normal paging coefficient, calculates the paging occasions and reception times of the paging instances in each of the paging occasions by using the identifier and the Multicast/Broadcast Multimedia Service paging coefficient, receives the paging instances over the first channel at the reception times of the paging instances for each of the paging occasions calculated by using the normal paging coefficient from the present until the activation time, and receives the paging instances over the first channel at the reception times of the paging instances for each of paging occasions calculated by using the Multicast/Broadcast Multimedia Service paging coefficient beginning at the activation time.

14. The apparatus of claim 13, wherein the receiver receives, until the activation time, receives the paging instances at the reception times of the paging instance for each of paging occasions calculated by using the normal paging coefficient and receives the paging information by receiving the second channel after a lapse of a preset time if the received paging instances indicate presence of the paging information, wherein the receiver receives, from the activation time, the paging instances at the reception times of paging instances for each of paging occasions calculated by using the Multicast/Broadcast Multimedia Service paging coefficient and receives the paging information by receiving the second channel after a lapse of a preset time if the received paging instances indicate presence of the paging information.

15. A method for paging a user equipment providing a Multieast/Broadcast Multimedia Service in a mobile communication, comprising the steps of:
(a) calculating by the user equipment paging occasions for receiving a signal from a first channel and reception times of paging instances in each of the paging occasions related to the Multicast/Broadcast Multimedia Service by using parameters, the parameters including an identifier indicating the Multicast/Broadcast Multimedia Service, normal paging coefficient, and Multicast/Broadcast Multimedia Service coefficients related to the paging occasions;
(b) receiving by the user equipment the paging instances at the reception times of the paging instances for each of the paging occasions; and
(c) receiving by the user equipment the paging information by receiving a second channel after a lapse of a preset time if the received paging instances indicate presence of the paging information.

16. The method of claim 15, wherein the parameters are transmitted over the first channel.

17. The method of claim 15, wherein the parameters include an activation time indicating a transmission start time of the paging occasions, all of which are transmitted over the first channel.

18. The method of claim 17, wherein step (b) further comprises the step of receiving the paging instances at the reception times of the paging instances for each of the paging occasions beginning at the activation time.

19. The method of claim 17, wherein step (a) further comprises the step of calculating the paging occasions and reception times of the paging instances in each of the paging occasions by using the identifier and the normal paging coefficient, and calculating the paging occasions and reception times of the paging instances in each of the paging occasions by using the identifier and the Multicast/Broadcast Multimedia Service paging coefficient.

20. The method of claim 19, wherein step (b) further comprises the step of receiving the paging instances over the first channel at the reception times of the paging instances for each of the paging occasions calculated by using the normal paging coefficient from a first time until the activation time, and receiving the paging instances over the first channel at the reception times of the paging instances for each of the paging occasions calculated by using the Multicast/Broadcast Multimedia Service paging coefficient beginning at the activation time.

* * * * *